United States Patent [19]

Achenbach et al.

[11] 4,023,332
[45] May 17, 1977

[54] POWER GRASS SHEARS

[75] Inventors: Dieter Achenbach, Betzdorf; Siegfried Joswig, Kausen; Walter Kolb, Betzdorf, all of Germany

[73] Assignee: Wolf-Gerate GmbH, Germany

[22] Filed: Aug. 8, 1975

[21] Appl. No.: 603,233

[30] Foreign Application Priority Data

Aug. 8, 1974 Germany .......................... 2438360
Jan. 21, 1975 Germany .......................... 2502327

[52] U.S. Cl. .......................... 56/16.9; 30/DIG. 5; 56/17.1; 56/17.6
[51] Int. Cl.$^2$ .......................... A01G 3/06
[58] Field of Search .......... 56/11.9, 16.9, 17.6, 56/15.6, 17.1, DIG. 18, 256, 17.5; 280/47.17, 47.24; 30/DIG. 1, DIG. 5

[56] References Cited

UNITED STATES PATENTS

| | | | |
|---|---|---|---|
| 2,795,915 | 6/1957 | Miller | 56/17.1 X |
| 3,350,864 | 11/1967 | Sheps et al. | 56/16.9 |
| 3,490,213 | 1/1970 | Pinto | 56/16.9 |
| 3,759,020 | 9/1973 | Simmons | 30/DIG. 1 |

*Primary Examiner*—J.N. Eskovitz
*Attorney, Agent, or Firm*—Ostrolenk, Faber, Gerb & Soffen

[57] ABSTRACT

Power grass shears detachably attached to a handle: the handle includes a rod extending in the cutting plane; a connection between the shears and the rod to enable the shears to be rotated around the rod; the connection comprises various arrangements of a pin, and detent like means for enabling the shears to be held at various rotative positions.

22 Claims, 14 Drawing Figures

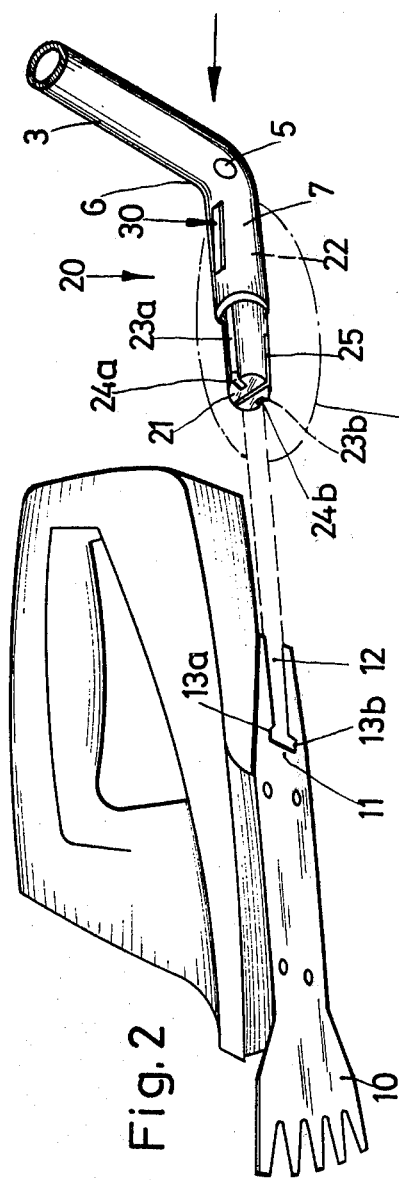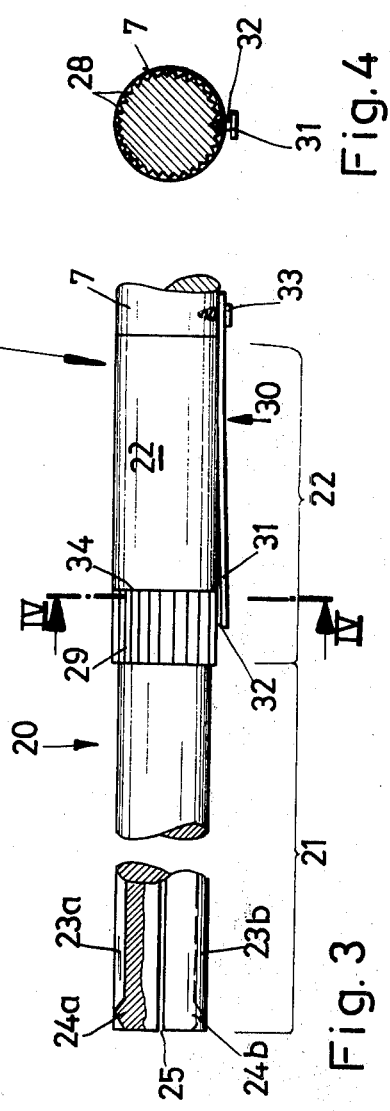

POWER GRASS SHEARS

The invention relates to power grass shears which are detachably connectable to a guide handle which handle consists of an angled rod. The invention also relates to a connecting piece for mounting the grass shears on the handle.

In known battery-driven power grass shears the connecting piece to the guide handle is in the form of a roll stick and it is constructed as a rail which can be screwed either to the roll stick or to the grass shears and which can be secured to the counter piece by clamping. A disadvantage of this coupling is the fact that the angular position of the grass shears with respect to its horizontal longitudinal axis cannot be changed. The cutting plane of the grass shears that are mounted on the roll stick thus extends parallel to the ground on which the rollers of the roll stick rest. However, when cutting lawn edges, and in particular at the junction of the lawn with slabs, it is desirable to employ a cut that is inclined to the ground to cut overhanging grass blades. In such cases it was hitherto necessary to detach the grass shears from the roll stick and to achieve the correct cutting angle by holding the shears in the hand position.

Manually-operated grass shears comprising a roll stick are known and which permit adjustment of the cutting angle via a rotary joint between the shears and the roll stick, but with which with these, it is impossible to detach the grass shears from the roll stick.

The problem underlying the invention is to construct battery-operated power grass shears of the type mentioned above which are detachable from the handle and which enable an inclined position of the shears with respect to the cutting plane can be achieved in a manner simple from the technical and operating point of view.

According to the invention this problem is solved in that the connecting piece for the grass shears is rotatable with respect to the angled end of the roll stick about the axis of the roll stick end and it is lockable in a plurality of angular positions.

Embodiments of the invention will be described with the aid of the accompanying drawings, wherein:

FIG. 2 is a perspective view of the grass shears obliquely from below with a detached roll stick;

FIG. 3 is a detail of FIG. 2 to a larger scale;

FIG. 4 is a section along the line IV—IV of FIG. 3;

Figure 1:
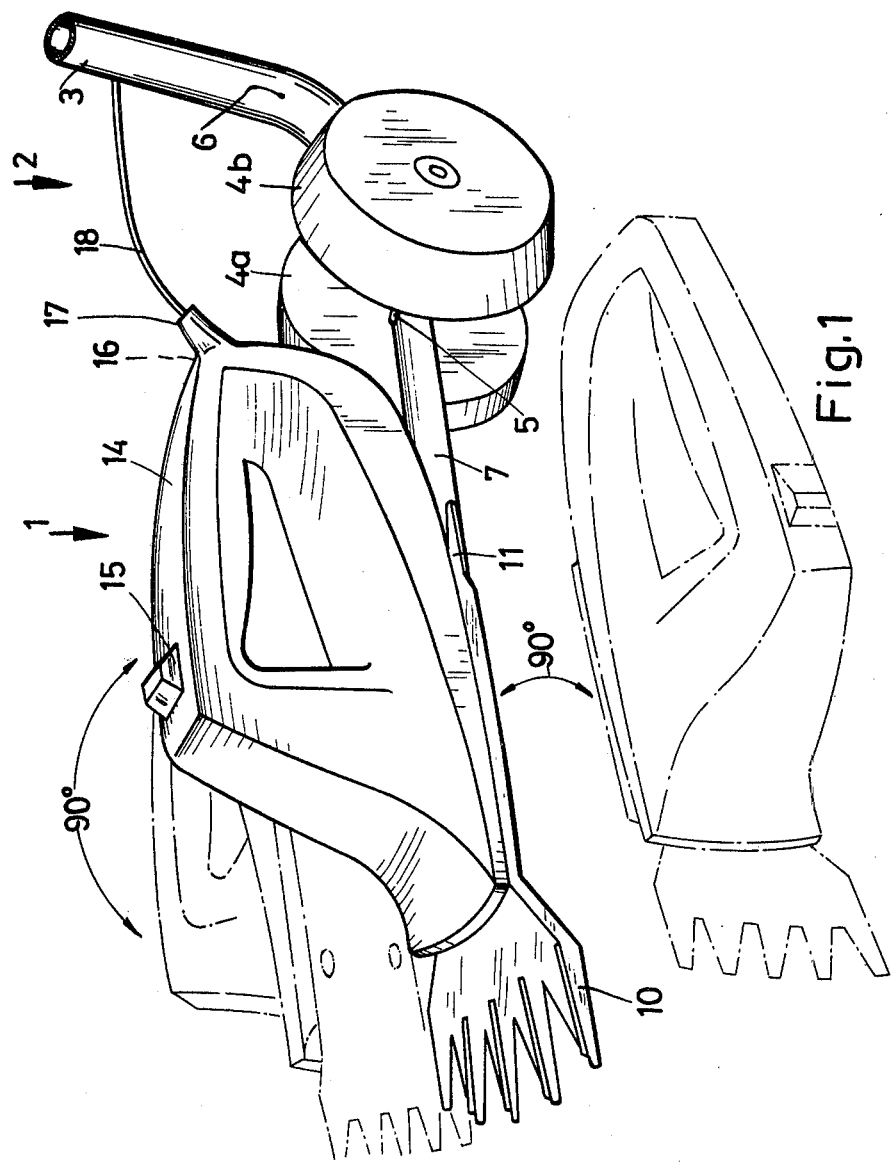
FIG. 1 is a perspective view of power grass shears coupled to a roll stick.

FIG. 1 shows battery-driven power grass shears 1 which are detachably coupled to a roll stick 2. The roll stick 2 consists of an angled metal rod 3 of which only the lower end and not the grip end is illustrated, and consists of a pair of rollers 4a, 4b whose axis of rotation 5 passes through the metal rod 3 in the vicinity of the angled region 6 of the rod. Expediently, the metal rod 3 is bent at 6 from a tube length having a front angled tube end 7.

The power grass shears 1 comprise a stationary cutting blade 10 which defines the cutting plane and which continues rearwardly to a coupling plate 11, as seen from FIG. 2. The coupling plate 11 comprises a receiving slot 12 of predetermined width. At the inner end of slot 12, two lateral recesses 13a, 13b are provided. At the front of the operating grip 14 of the shears 1, there is a switch 15 and at the rear portion of the grip 14 there is a socket 16. The socket to enables the battery of the shears to be charged and it permits control via a plug 17 whose cable 18 leads to a switch which is not illustrated and is provided on the operating grip of the roll stick 2.

In FIG. 2 the front end of the roll stick 2 is illustrated in perspective rollers 4 are omitted. A pin 20 of plastic is inserted into the tube end 7. The pin 20 is comprising of a front plug-on portion 21 and of a rear rotary portion 22 which is mounted in the tube portion 7. The plug-on portion 21 comprises two longitudinal grooves 23a, 23b which lie in a horizontal or only slightly forwardly inclined plane when the tubular metal rod 3 assumes its normal operating position as illustrated in FIG. 1. Each longitudinal groove 23a, 23b comprises at its entry point a cam 24a, 24b which comprises at least an entry inclined face and preferably also an exit inclined face. The distance between the two grooves 23a, 23b, measured at the groove bottoms corresponds substantially to the width of the receiving slot 12 in the coupling plate 11. The plug-on portion 21 further comprises a slot 25 which is arranged perpendicularly to the grooves 23a, 23b and which absorbs the resilient yieldability of the plug-on portion. To couple the grass shears to the roll stick the plug portion 21 is plugged via the cams 24a, 24b into the receiving slot 12. The plug in connection is possible because of the resilient yieldability of the plug portion 21. At the end of the plugging movement the cams 24a, 24b engage in the lateral recesses 13a, 13b in the coupling plate 11. A firm jerk is sufficient to detach the grass shears from the roll stick 2. This causes the edges of the recesses 13a, 13b to run against the cams 24a, 24b and compresses the plug portion 21 so that the cams 24a, 24b can pass through the receiving slot 12.

Instead of the recesses 13a, 13b in the coupling plate 11 and the cams 24a, 24b on the plug portion 21, conversely recesses, for example in the form of a transverse bore, could be provided in the plug portion and resilient cams or a latch could be mounted on the coupling plate to secure the connection between the plug portion and coupling plate.

Figure 7:
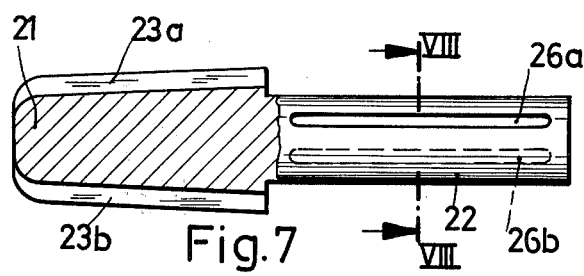
FIG. 7 shows a second alternative embodiment to the detail of FIG. 3.
Figure 8:
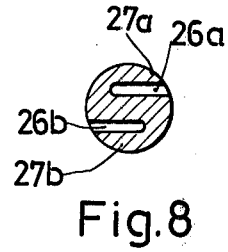
FIG. 8 is a section along the line VIII—VIII of FIG. 7.

In the embodiment according to FIGS. 7 and 8 of the pin 20 the plug portion 21 is conically constructed at least in the plane of the two longitudinal grooves 23a, 23b so that upon insertion of the plug portion 21 into the receiving slot 12, securing is achieved due to the clamping action. In this case, the recesses 13a, 13b in the coupling plate 11 are not necessary.

The rotary portion 22 of the pin 20 consists in the simplest case of a resilient clamping cylinder which is provided with longitudinal slots 26a, 26b for forming portions 27a, 27b whose planes are offset with respect to each other as apparent from FIGS. 7 and 8. In the dimension perpendicular to the planes of the longitudinal slots 26a, 26b the rotary portion 22 is slightly larger than the internal diameter of the tube end 7, causing the portions 27a, 27b to yeild resiliently on assembly thereby to effect clamping. The clamping effect is sufficient to hold the grass shears 1 in their selected respective angular positions but is small enough to permit the angular position of the grass shears to be changed easily by manual turning at the grip 14, utilizing the leverage which the placement of grip 14 with respect to the axis permits.

Figure 6:
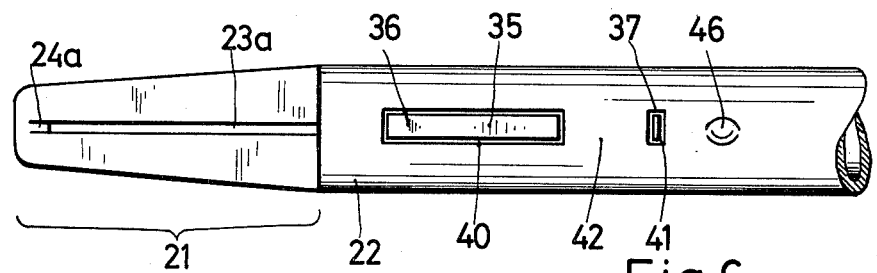
FIG. 6 is a detail of FIG. 5 but rotated through 90°.

In the embodiment according to FIGS. 3 and 6 the rotary portion 22 comprises a section 29 which is provided with longitudinal flutes 28 and which cooperates with a spring detent 30. The spring detent 30 consists in the embodiment according to FIG. 3 of a leaf spring 31 at the front end of which a nose 32 is provided, the spring 31 is secured to the tube end 7 be means of a sheet metal screw 33. Due to the fluting 28 a shoulder 34 is formed between the section 29 and the rest of the rotary portion 22 so that the pin 20 cannot unintentionally come out of the tube end 7 because the nose 32 engages said shoulder 34. On the other hand, rotation of the pin 20 through the respective angular distance separating the flutes 28 from each other is possible. This angular distance may for example be 15°. The spring detent 30 forms a ratchet of sorts.

Figure 5:
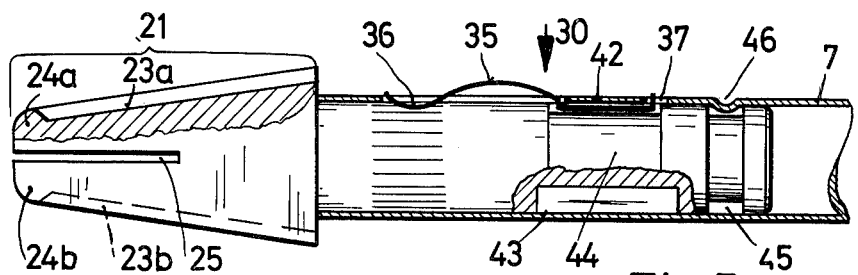
FIG. 5 shows an alternative embodiment of the detail of FIG. 3.

In the embodiment according to FIGS. 5 and 6 the spring detent 30 consists of a spring sheet metal strip which is bent to form a bow spring 35 which has an inwardly bent front end 36 and a rear end 37 bent in hook manner, whereas the center portion of the spring 35 is outwardly wave-shaped. The spring 35 is inserted in a channel between the tube end 7 and the rotary portion 22 and the spring extends into slitlike recesses 40, 41 of the tube end 7. Between the recesses a web 42 is left round which the hook-shaped end 37 engages. There is an assembly slot 43 in the pin 20 which is deep enough to permit the hook 37 to yield on assembly of the bow spring 35. Around on the remainder of the periphery of the pin in the region of the assembly slot 43 there is a shallow annular groove 44 so that the corresponding portion of the bow spring 35 can be accommodated in said annular groove 44 when turning of the pin with respect to the tube end 7 takes place. If disassembly is necessary the pin 20 is turned so that the assembly slot 43 and the spring 35 lie above each other, because in all other positions in effect a locking of the pin 20 in the tube end 7 is achieved. If desired, a further securing can be effected by a depression in the tube wall above a further annular recess 45, as indicated at 46.

A feature common to all the embodiments described is that the pin 20 is firmly held in the tube end 7 and comprises a projecting plug portion 21 adapted to be plugged onto the coupling plate 11 of the grass shears 1. By turning the grass shears 1 about the longitudinal axis of the pin 20 the pin 20 is also turned. The rotary portion 22 permits such a turning movement which presenting a certain resistance without the rotary portion coming out of the tube end 7. Of course, the converse of the arrangement described is possible, i.e., tubular rotatable receiving means can be provided on the grass shears 1 whereas the roll stick 2 has a corresponding plug half. A further possible modification resides in that instead of being a pin the connecting piece is a tube which engages round the tube end 7 and cooperates with detent recesses provided therein so that rotation of the tubular connecting piece with respect to the tube end 7 is possible but it is not possible for detachment of the connecting piece and tube end 7 to occur during normal operation.

Figure 9:
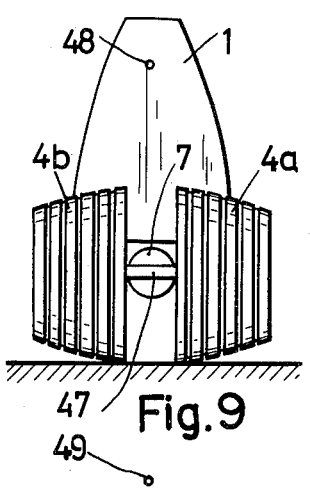
FIG. 9 is a schematic view of the grass shears and the roll stick, viewed from behind.
Figure 10A:
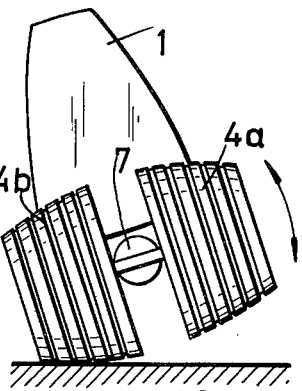
FIGS. 10a and 10b show two pivoted position of the grass shears and the roll stick.
Figure 10B:
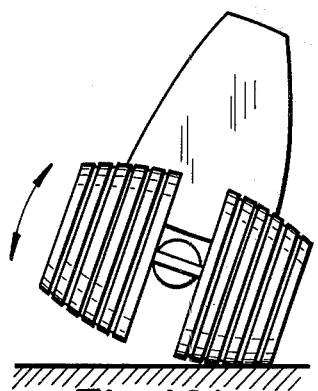

FIGS. 9 and 10 show a further possibility for changing the cutting plane of the grass shears by lateral tilting of the roll stick 2. Due to the crowned shape of the rollers 4a, 4b an inclined position of the cutting plane is possible without appreciable lifting of the cutting plane. If the center of curvature of the spherically formed, i.e., crowned, rollers 4a, 4b is made the point of intersection 47 of the axis 5 with the axis of the tube end 7, no raising of the cutting plane at all occurs when the roll stick is laterally tilted. If on the other hand a circle lying in the plane of symmetry is chosen as geometrical location for the centers of curvature of the crowned rollers 4a, 4b, the points of intersection 48, 49 of which with the plane of the drawings are indicated, a certain raising of the cutting plane (cf. FIG. 10a) takes place on lateral tilting of the roll stick but in this case the effect of the so called "cork tumbler" is achieved, i.e., the combination of grass shears and roll stick tends to return to the normal position illustrated in FIG. 9. Obviously, apart from the left turn illustrated in FIG. 10 pivoting to the right is possible with the same effect (FIG. 10a). The centers of curvature also need not lie exactly in the plane of symmetry, lateral deviation being possible.

Figure 11:
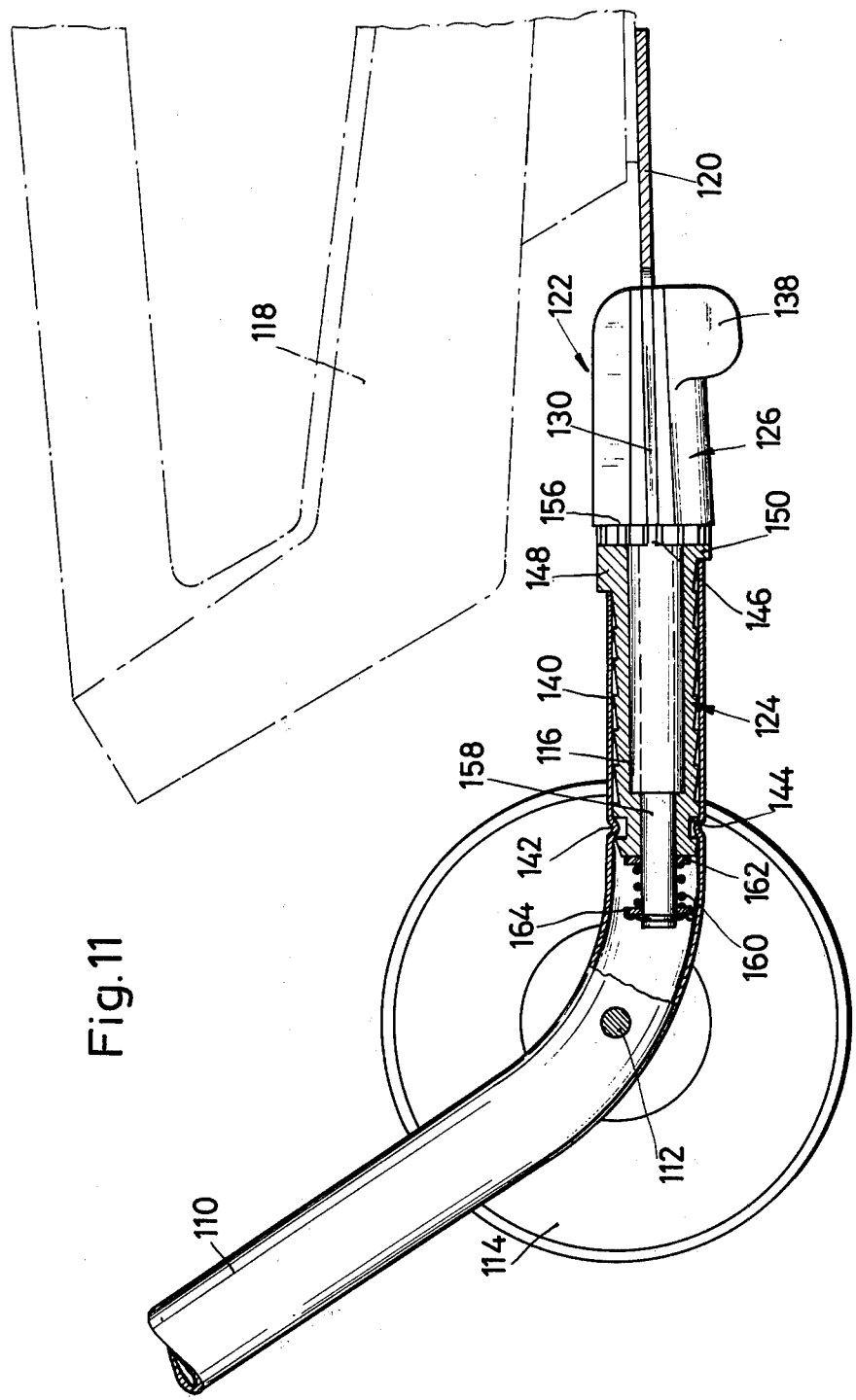
FIG. 11 shows a partially sectioned view of a roll stick with rotary joint and mounting plate for the grass shears in a modified embodiment.
Figure 12:
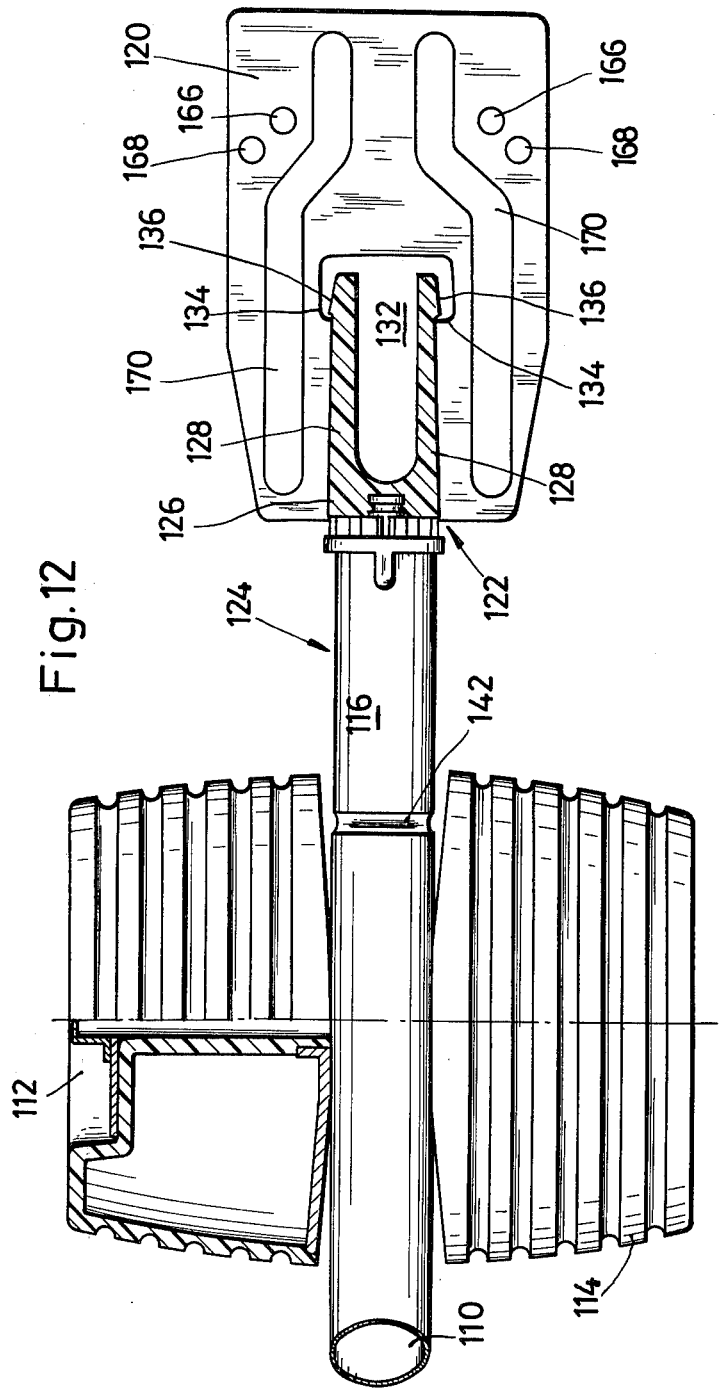
FIG. 12 is a plan view of the roll stock shown broken away with mounting plate according to FIG. 11.
Figure 13:
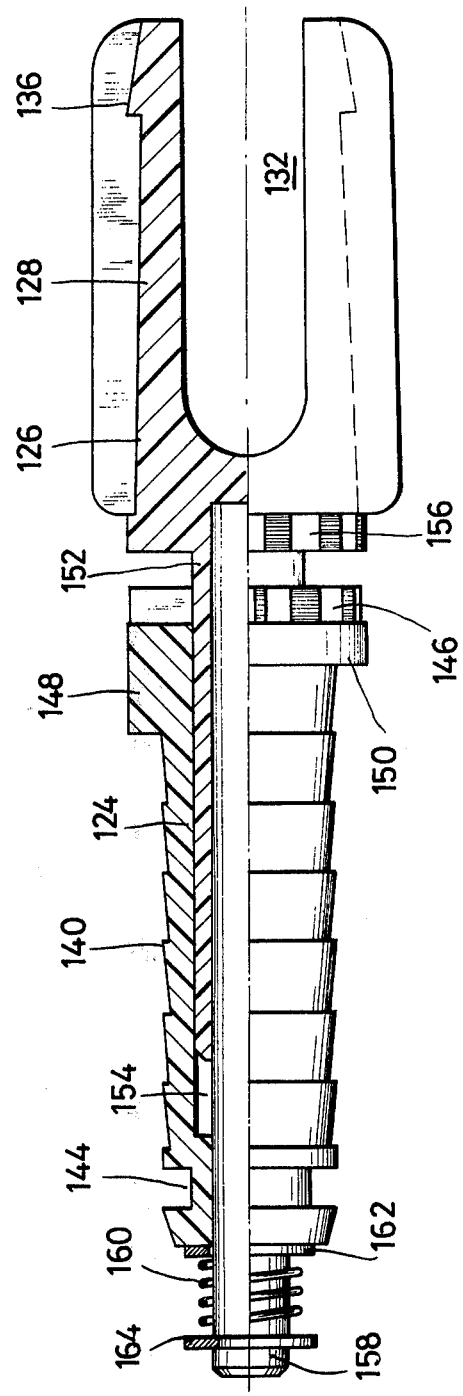
FIG. 13 shows to a larger scale a section of the rotary or pivot joint according to FIGS. 11 and 12.

The embodiment according to FIGS. 11-13 will be described.

Only the lower portion of the tubular roll stick 110 carrying the axle 112 for the rollers 114 is illustrated. In the region of the axle mounting, the roll stick has a bent portion and merges into the tube end 116 which extends horizontally in the position of use. The grass shears 118, which are only diagrammatically illustrated, are carried by a mounting plate 120 to which they are screwed. The connection between the mounting plate 120 and tube end 116 is via a connecting piece 122 which comprises a rotary joint whose axis of rotation coincides with the axis of the tube end 116. The connecting piece 122 consists of a detent sleeve 124 and a plug pin 126 which may both be moulded from suitable plastic.

The plug pin 126 comprises two fork arms 128 which are provided at their oppositely disposed outer surfaces with axial insert grooves 130. The mounting plate 120 is pushed onto said grooves 130 with the edges of a correspondingly dimensioned slot 132. At the bottom the slot is provided with a lateral widened portion 134 into which in the inserted state detent noses 136 of the fork arms 128 engage. The dimensioning is such that the fork arms consisting of suitably resilient plastic are biased outwardly in the inserted state.

The two fork arms 128 are provided with grip extensions 138 and by compressing the latter the detent locking 134, 136 can be released.

The detent sleeve 124 comprises a sleeve body 140 which is provided with sawtooth ribs and with which the sleeve is inserted into the tube end 116. An annular bead 142 pressed into the tube end 116 engages in the inserted state in an outer annular groove 144 of the sleeve. At the end face projecting from the tube end 116 the detent sleeve is provided with a ring of coupling teeth 146. With radial webs 148 and 150 the sleeve engages in corresponding slits in the tube end 116, securing against rotation.

The plug pin carries the fork arms 126 described above which cooperate with the mounting plate 120 of the grass shears. It is provided with a sleeve extension 152 with which it projects into the cylindrical inner bore 154 of the detent sleeve. End-face coupling claws 156 come into engagement with the coupling claws 146 of the detent sleeve. In the sleeve 152 a steel pin 158 is inserted and secured against rotation and against axial movement by a corresponding interference fit or by adhesive and/or possibly by means of a securing pin. This steel plug pin imparts to the rotary joint the necessary stability. Fitted to the portion of the steel pin 158 projecting from the detent sleeve is a helical spring 160 which in turn bears on an annular disc 162 which is supported via the inner end annular surface of the detent sleeve. On the other side the spring 160 bears on an annular disc 164 which is fixed at the end of the pin 158. Said helical spring 160 thus biases the coupling 146, 156 into the engaged position.

The grass shears may be connected to the roll handle in very simple manner by inserting the mounting plate 120 with its slit edges into the grooves 130 of the fork arms. When this is done the arms are resiliently pressed inwardly and expand after the locking noses 136 have engaged in the widened portion 134. A setting of the relative angular position via the rotary joint can then be effected simply by withdrawing the plug pin axially so that the coupling claws 146, 156 come out of engagement. This withdrawal can be effected with the shears detached by gripping the fork arms or the grip portions or with the shears mounted by gripping the shears themselves. After adjustment of the desired angular position the plug pin merely needs to be released for the coupling to engage automatically.

According to the previous embodiments the mounting plate is formed by an extension of the lower stationary blade plate. According to another embodiment the mounting plate 120 is connected by screws to this blade plate and to the shears housing, these screws being passed through holes 166 or 168 of the mounting plate. For stiffening the mounting plate is reinforced by welded-on rods 170 or embossings or beads.

In the examples of embodiment described above the guide handle is constructed as roller stick. The guide handle may however alternatively be equipped with guide skids. Furthermore, the rollers or skids can be disposed instead of on the handle, or additionally thereto, on the shears themselves.

We claim:

1. Power grass shears means, comprising:
    grass shears located in a cutting plane and being operative to shear grass; means for operating said shears; said shears including a plug-in opening for a connecting piece;
    a handle, including a rod which is angled to extend generally in said cutting plane toward said shears;
    a separate connecting piece interposed between said shears and said handle rod for connecting said shears and said handle rod together to enable relative rotation of said shears about the axis of said handle rod; said connecting piece comprising a plug portion extending into said shears plug-in opening; said connecting piece further comprising a rotary portion in engagement with said handle rod;
    locking means for locking said shears at a particular one of a plurality of rotative positions with respect to said handle rod.

2. The power grass shears means of claim 1, wherein said rotary portion of said connecting piece is rotatable with respect to said handle rod while it is in engagement therewith.

3. The power grass shears means of claim 2, wherein said handle rod is tubular and said rotary portion of said connecting piece extends into said handle rod; said rotary portion having a larger width dimension than the interior of said rod; said rotary portion having longitudinal slits therein to absorb the squeezing of said rotary portion as it is inserted into said rod.

4. The power grass shears means of claim 2, wherein said locking means comprise longitudinal flutes around said rotary portion and spring detent means connected to said handle rod and engageable with said flutes.

5. The power grass shears means of claim 4, wherein said detent means comprise a bow spring that is engageable with said flutes; said handle rod having a slit passing therethrough; said bow spring being connected with said handle rod by engaging in said slit thereof.

6. The power grass shears means of claim 1, wherein said plug portion has longitudinally extending grooves defined therein;
    said shears plug-in opening is defined by a coupling plate having a receiving slot extending longitudinally thereinto; said receiving slot being defined between opposed edges of said coupling plate;
    said plug portion being inserted into said receiving slot in said coupling plate, with said longitudinal grooves of said plug portion receiving said edges of said coupling plate defining said receiving slot.

7. The power grass shears means of claim 6, wherein said plug portion is comprised of resilient material and has a longitudinally extending plug portion slot therein, whereby said plug portion may be compressed and this squeezes closed said plug portion longitudinally extending slot.

8. The power grass shears means of claim 6, wherein each said longitudinal groove of said plug portion has an entry portion facing into said receiving slot; a respective outwardly projecting cam at each said entry portion of the respective said longitudinal groove; said receiving slot of said coupling plate having a widened recess toward the bottom thereof which is shaped and positioned such that said cams snap thereinto upon insertion of said connecting piece plug portion into said recess.

9. The power grass shears means of claim 1, wherein said handle has rotatable riding rollers for said shears means attached thereto; said rollers being curved about an axis generally along said cutting plane.

10. The power grass shears means of claim 1, wherein said plug portion is comprised of two fork arms each having an outwardly facing side and said outwardly facing sides having outward extensions thereon; said shears having a receiving slot for said plug portion arms and said slot having a widened section into which said fork arm outward extensions snap when said plug portion is inserted into said receiving slot.

11. The power grass shears means of claim 10, wherein said shears includes a mounting plate in which said receiving slot is formed; said mounting plate including opposed edges which define said receiving slot; said plug arms having longitudinally extending grooves defined therein; said plug portion being inserted into said receiving slot with said longitudinally extending grooves of said plug arm receiving said edges of said mounting plate defining its said receiving slot.

12. The power grass shears means of claim 11, further comprising grippable extensions on said fork arms for being gripped to move said arms to be freed from engagement with said mounting plates at said receiving slot.

13. The power grass shears means of claim 11, wherein said mounting plate is provided with stiffening rods.

14. Power grass shears means, comprising:
grass shears located in a cutting plane and being operative to shear grass; means for operating said shears; said shears including a plug-in opening for a connecting piece;
a handle, including a rod which is angled to extend generally in said cutting plane toward said shears;
a separate connecting piece interposed between said shears and said handle rod for connecting said shears and said handle rod together to enable relative rotation of said shears about the axis of said handle rod;
said connecting piece being non-rotatably attached to both of said shears and said handle rod; said connecting piece being divided into two portions, with these said portions being connected to each other at a rotary joint, such that the two said portions may rotate with respect to each other, thereby enabling said shears to rotate with respect to said handle rod;
locking means for locking said connecting piece portions at a particular one of a plurality of rotative positions with respect to each other.

15. The power grass shears means of claim 14, wherein said connecting piece one portion comprises a detent sleeve which is inserted into said handle rod; said handle rod being hollow to receive said detent sleeve;
said connecting piece other portion comprises a plug pin detachably inserted in said plug-in opening of said shears;
respective coupling means affixed on each said portion of said connecting piece; said coupling means being mutually engageable, whereby said connecting piece portions may not rotate around said cutting plane with respect to each other, and said coupling means being disengageable, whereby said connecting piece portions may rotate around said cutting plane with respect to each other.

16. The power grass shears means of claim 15, wherein said coupling means both comprise respective engageable claws.

17. The power grass shears means of claim 15, further comprising biasing means for biasing said connecting piece detent sleeve and said plug pin to move with respect to each other so as to normally cause both said coupling means to engage; said detent sleeve and plug pin being movable against the force of said biasing means to separate said coupling means.

18. The power grass shears means of claim 17, wherein said biasing means extends between said detent sleeve and said plug pin.

19. The power grass shears means of claim 18, wherein said plug pin includes a portion that passes through said detent sleeve and said plug pin has a section that extends past and out of the end of said detent sleeve; said biasing means being a spring between said plug pin section and the end of said detent sleeve out of which said plug pin section projects.

20. The power grass shears means of claim 19, wherein said spring is a helical spring.

21. The power grass shears of claim 15, wherein said detent sleeve has sawtooth ribs on its exterior for engaging the interior of said rod; said detent sleeve having an outward projection therefrom; said rod having an opening therein through which said detent sleeve outward projection extends, whereby the engagement of said detent sleeve outward projection in said rod opening blocks rotation of said detent sleeve with respect to said rod;
an annular bead inside said rod; an annular groove on said detent sleeve; said bead being received in said groove for holding said detent sleeve in said rod against removal of said sleeve from said rod.

22. The power grass shears means of claim 19, wherein both of said detent sleeve and said plug pin are comprised of molded plastic material; said section of said plug pin comprises a steel pin which both extends through said detent sleeve and which supports said biasing spring.

* * * * *

UNITED STATES PATENT OFFICE
CERTIFICATE OF CORRECTION

Patent No. 4,023,332    Dated May 17, 1977

Inventor(s) Dieter Achenbach, Siegfried Joswig, Walter Kolb

It is certified that error appears in the above-identified patent and that said Letters Patent are hereby corrected as shown below:

On the cover sheet at [30] Foreign Application Priority Data, "Aug. 8, 1974" should read: --Aug. 9, 1974--.

Signed and Sealed this

Seventeenth Day of January 1978

[SEAL]

Attest:

RUTH C. MASON
Attesting Officer

LUTRELLE F. PARKER
Acting Commissioner of Patents and Trademarks